FIG. 11A

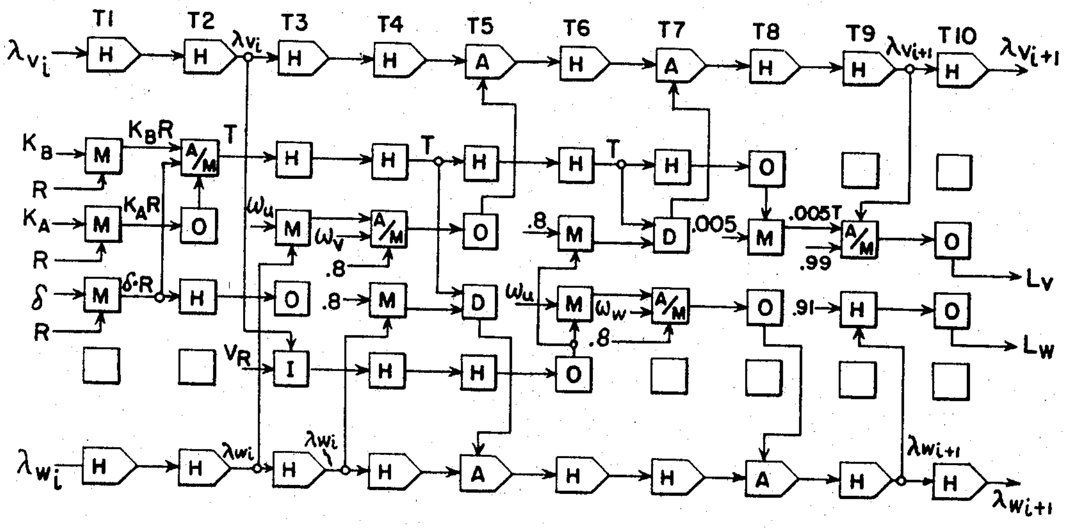

FIG. 11B

| | PW-I | | PWM II | | PWM III | | PWM IV | | INVERTER | | INTEGR. I | | INTEGR. II | |
|---|---|---|---|---|---|---|---|---|---|---|---|---|---|---|
| | D-C | P-W | D-C | P-W | D-C | P-W | D-C | P-W | D-C | | | P-W | | P-W |
| T1 | $K_B$ | $t_R$ | $K_A$ | $t_R$ | $\delta$ | $t_R$ | — | — | — | | | — | | — |
| T2 | $V_{03}$ | $t_2$ | $\pm V_R$ | $Pt_2$ | — | — | — | — | — | | | — | | — |
| T3 | — | — | $\pm\omega_u$ | $Pt_{I2}$ | $\pm V_R$ | $Pt_3$ | $\pm V_R$ | $Pt_{I1}$ | — | | | — | | — |
| T4 | — | — | $\pm\omega_v$ | .8T | $.8V_R$ | $Pt_{I2}$ | — | — | — | | | — | | — |
| T5 | — | — | $\pm V_R$ | $Pt_2$ | $\pm V_{01}$ | $Pt_3$ | — | — | $V_{01}$ | | | $Pt_2$ | | $Pt_3$ |
| T6 | — | — | $.8V_R$ | $Pt_4$ | $\omega_u$ | $Pt_4$ | $\pm V_R$ | $Pt_4$ | — | | | — | | — |
| T7 | — | — | $\pm V_{01}$ | $Pt_2$ | $\omega_v$ | .8T | — | — | $V_{01}$ | | | $Pt_2$ | | — |
| T8 | $\pm V_R$ | $Pt_1$ | .005 | $t_1$ | $\pm V_R$ | $Pt_3$ | — | — | — | | | — | | $Pt_3$ |
| T9 | — | — | $\pm.99$ | $Pt_{I1}$ | .91 | $Pt_{I2}$ | — | — | — | | | — | | — |
| T10 | — | — | $\pm V_R$ | $Pt_2$ | $\pm V_R$ | $Pt_3$ | — | — | — | | | — | | — |

PROGRAM GENERATOR 40'

United States Patent Office 3,443,074
Patented May 6, 1969

3,443,074
SEQUENTIAL ANALOG-DIGITAL COMPUTER
Hermann Schmid, Binghamton, N.Y., assignor to General Electric Company, a corporation of New York
Filed Oct. 1, 1965, Ser. No. 492,037
Int. Cl. G06g 7/28, 7/30, 7/32
U.S. Cl. 235—150.4 6 Claims

ABSTRACT OF THE DISCLOSURE

A sequential computer producing analog accuracy and having relatively low speed which includes an analog arithmetic unit controlled by switching, a digital logic sequency programmer, and a simple counter memory. The arithmetic unit made up of integrators, inverters and comparators use those components both in operations and as part of input/output operations. The arithmetic unit also uses time as a primary operating variable to permit use of pulse width signals.

This invention is directed to a novel type of computer for applications which require only limited accuracy but which require the flexibility, versatility, and stability normally associated with digital computer apparatus.

There is a steady increase in the application of digital computers to analog control systems, where the inputs to the computer are the outputs from analog sensors and the outputs from the computer must drive analog controls. This growth occurs even in cases where typical analog computer accuracy (1%) would be quite sufficient. The reasons for this are obvious. Digital computers can be built to be small, reliable, use little power, and to have insensitivity to changes in environment. Conventional analog computers in comparison are relatively large, unreliable, vary considerably with change in environment, require precision components, stable power supplies and many adjustments. Besides, conventional analog computers do not lend themselves easily to sequential operation. However, a comparison of this type is worthless unless the interface equipment required with the digital computer is also included. In control applications with many signals, but with few computations, the size, weight, and cost of the interface circuits may equal or even exceed those of the computer. Besides, the analog-to-digital and digital-to-analog conversion circuits are subject to the same shortcomings and limitation as the analog computer circuits.

The use of programs to control a sequence of arithmetic operations is a very powerful tool in solving practical computer problems. Heretofore, it has generally appeared that enabling programmed sequential analog operations required the introduction of analog storage means and program control apparatus which multiplied the complexity of analog computers to a degree that the adoption of digital computer apparatus has appeared safer and easier.

Accordingly, it is an object of the invention to provide a sequential computer which has analog computer simplicity for the arithmetic unit but which is adapted to have program versatility comparable to a sequential digital computer.

It is another object of the invention to provide a computer utilizing an analog arithmetic unit but which has a memory with digital computer memory stability characteristics.

It is a further object of the invention to provide a sequential computer which does not require digital-to-analog and analog-to-digital conversion apparatus for input and output functions.

It is a general purpose of the invention to provide a computer having the versatility of a conventional sequential digital computer but having a very low level of complexity, on the order of analog apparatus generally.

Briefly stated, in accordance with certain aspects of the invention, a technique has been discovered to obtain computer flexibility and simplicity with reasonable accuracy and speed. The invention is characterized by: the use of an analog arithmetic unit in which the desired arithmetic operation is selected by simple switching; a sequence programmer requiring only a simple matrix of elements for controlling analog switches; and a memory (where necessary) which stores variable signals as pulse-width signals. Keys to the simplicity are compatibility of all units with pulse-width signals and the capability of the arithmetic unit to perform temporary storage functions.

Preferably, the arithmetic unit is comprised of conventional integrators, inverters, and comparators which are adapted to utilize time as a primary operating variable. These elements are arranged to perform dual functions, that is, perform arithmetic operations in accordance with selected switching and also perform essential parts of the input and output storage operations. The arithmetic unit operates with a simple counter type of memory which stores variables as pulse-width signals. These functions and arithmetic operations require only the simplest kind of programming apparatus to provide a sequence of parallel analog switch control signals. These features hinge on the arithmetic unit having the power to perform complete arithmetic operations without needing a memory unit.

The invention, together with further objects and advantages thereof, may best be understood by referring to the following description taken in conjunction with the appended drawings in which like numerals indicate like parts and in which:

FIGURES 11A–11D are diagrams illustrating application of the novel computer to an algebraic problem.

Figure 1:
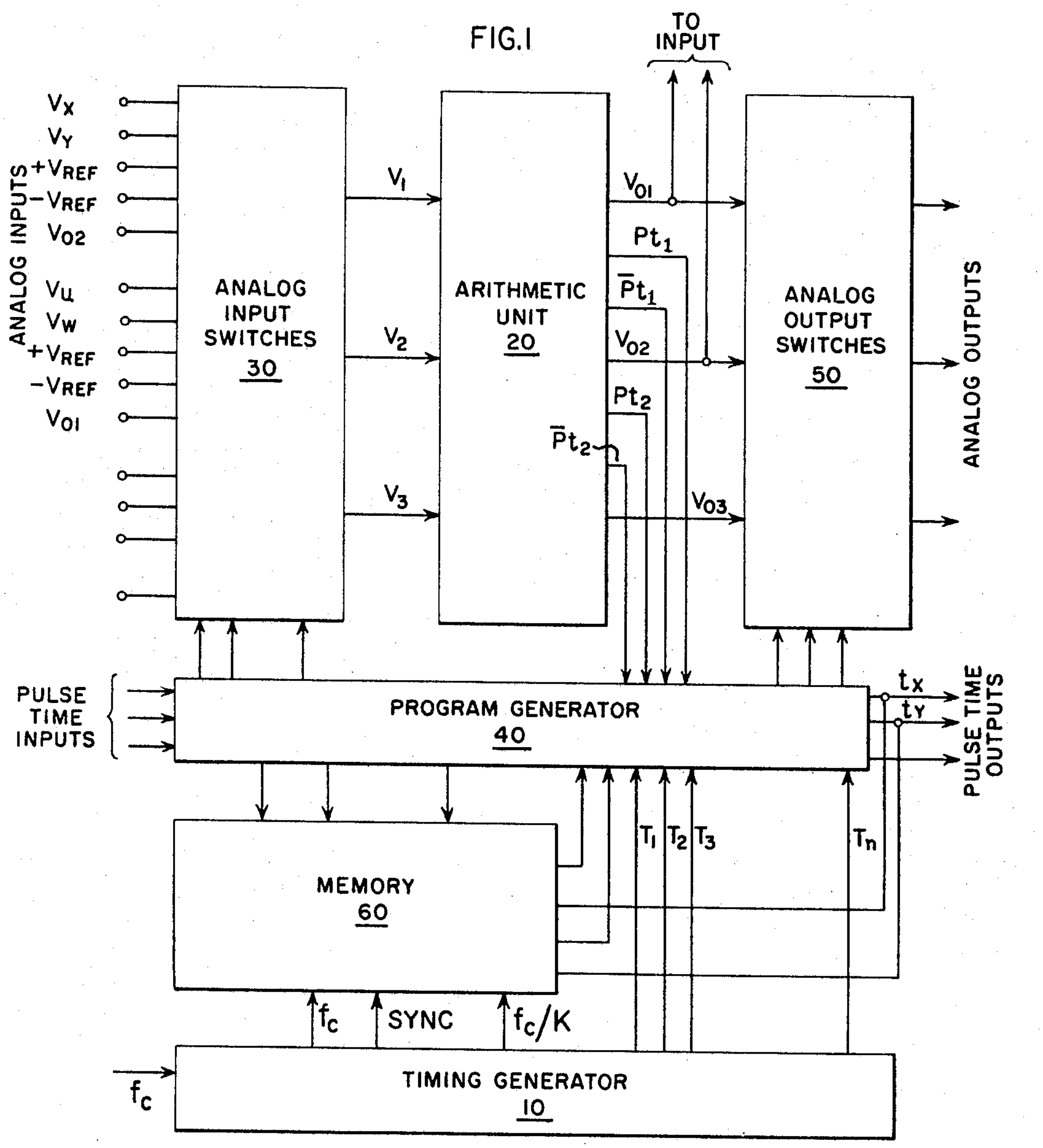
FIGURE 1 is a block diagram illustrating the organization of the novel sequential computer.
Figure 3:
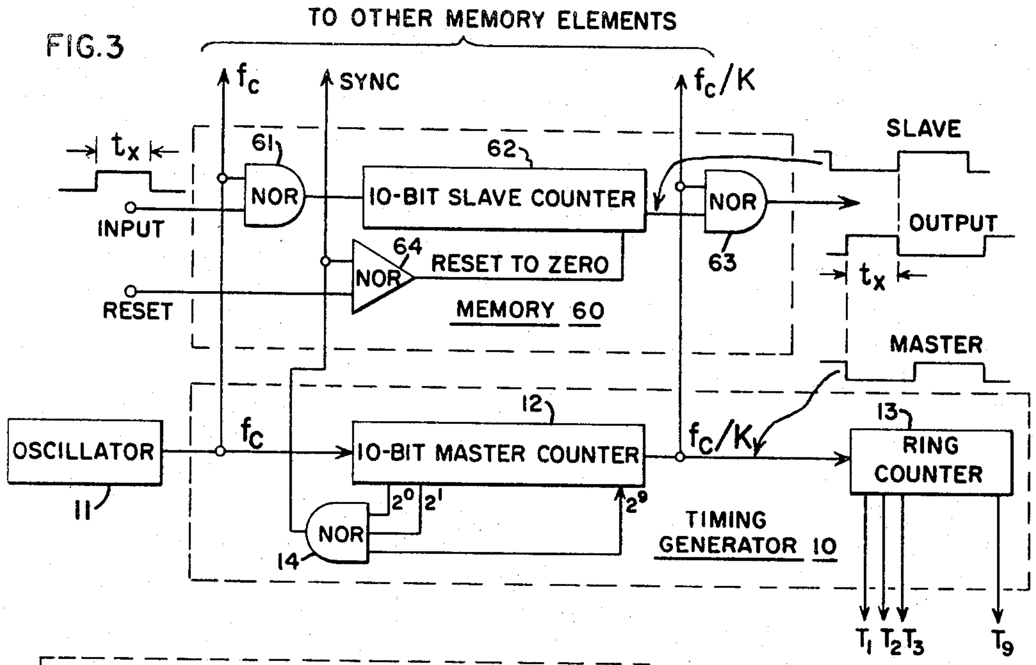
FIGURE 3 is a diagram illustrating the construction of portions of the memory and timing generator in the FIGURE 1 computer.

In the block diagrams of FIGURES 1 and 3, a source of timing signals, namely timing generator 10, is shown for arithmetic and memory operations. The computer is organized to operate cyclically, performing SET and selected arithmetic operations in succeeding operation periods $T_1, T_2, \ldots T_n$. Conveniently, the ultimate reference is an oscillator 11 or an equivalent conventional digital computer device producing pulses at a constant clock frequency $F_c$, such as 1 mc. A master counter 12 operates essentially as a frequency divider to provide incremental step timing periods. A binary counter with ten stages, $K=2^{10}$, produces pulses at a typical frequency of approximately 1 kc.$=f_c/K$, which provides pulse periods having durations suitable for performing analog computer operations. The pulses from counter 12 are applied to ring counter 13 which operates very much like a stepping switch to sequentially select the computer operation periods $T_1, T_2 \ldots T_n$. This results in a continuously repeating computer cycle of $n$ sequential periods, each period having a basic duration determined by $f_c$ and the capacity of counter 12. However, by connecting the output of more than one stage of ring counter 13 together, successive regular periods can be combined to provide multiple length periods.

The choice of computer operations to be performed is made by the program generator 40 which operates analog switches in the input section 30 to control the input signals applied to an analog arithmetic unit 20. Program generator 40 also controls the output analog switches 50 and the inputs to memory 60. Because the basic physical operating variable of arithmetic unit 20 is time, and because of its organization, the computer is compatible with signals representing variables in a number of different forms.

Figure 2:
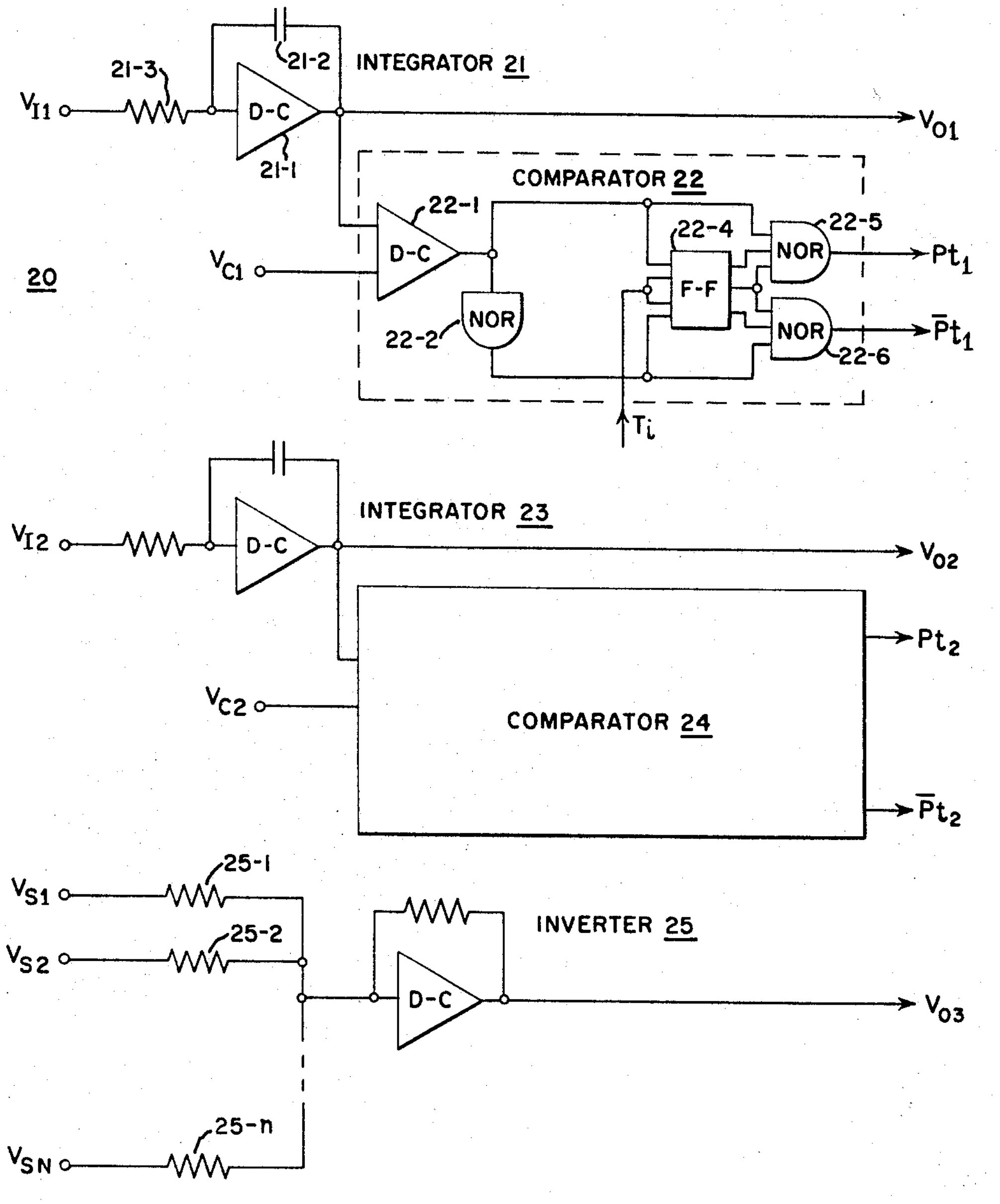
FIGURE 2 is a block diagram of the arithmetic unit in FIGURE 1.

The fundamental arithmetic unit illustrated in FIGURE 2 incorporates the same basic components utilized in the "Electronic Analog Resolver" described in the copending patent application Ser. No. 471,007, filed July 12, 1965 by Hermann Schmid. The minimum recommended basic components for flexible programming are a pair of conventional integrators 21 and 23, a pair of comparators 22 and 24 and an inverter 25. Integrator 21 is comprised of an operational D-C amplifier 21–1 with a feedback connected integrating capacitor 21–2 and a current summing resistor 21–3. In FIGURE 2 $V_{I1}$, $V_{I2}$, $V_{O1}$, $V_{O2}$, $V_{C1}$, $V_{C2}$ designate the terminals of the first and second channels for input, output and constant quantities respectively. The input quantities can be either analog or reference voltages or pulse-width signals and the output quantities are the products of the component from which they exit. The comparator 22 senses the voltage across the capacitor 21–2 and compares it with a reference D-C signal level, usually ground applied at terminal $V_{C1}$. For example, capacitor 21–2 would have a voltage across it proportional to the solution of an arithmetic operation. This signal can be READ or transferred to the memory 60 by deriving a pulse-width signal $Pt_1$ proportional to the D-C voltage on the capacitor. During the appropriate computer $T_1$, a reference voltage $V_R$ is applied to the first input terminal of arithmetic unit 20, i.e. at $V_{I1}$ of integrator 21 with a polarity appropriate to discharge capacitor 21–2. By the application of a signal $T_1$ (which is the general case of $T_1, T_2 \ldots T_n$) to flip-flop 22–4, the output pulse signal $Pt_1$ starts by reason of flip-flop 22–4 being switched to the SET condition. The output of the D-C amplifier 22–1, conveniently a conventional differential amplifier type, is limited and applied to NOR gate 22–2 to provide signals representing the polarity of the signal on capacitor 21–2. When capacitor 21–2 has been discharged by the reference voltage, the polarity of the output signal from D-C amplifier 22–1 reverses and resets flip-flop 22–4, thereby terminating the pulse signal $Pt_1$. In memory 60, a slave counter 62 (FIGURE 3) is driven in parallel with the master counter 12 of timing generator 10. By utilizing the signal $t_x$ to operate add-subtract switch 61, slave counter 62 either advances or retreats in phase relative to the master counter by an amount proportional to the pulse-width signal $t_x$. After $t_x$ terminates, this phase relationship is maintained indefinitely and the signal has been stored digitally. Integrator 23 and comparator 24 operate in the same manner as integrator 21 comparator 22. The inverter 25 is conveniently adapted to sum a plurality of input analog signals by means of the parallel current summing resistors 25–1, 25–2 . . . and **25–*n***.

In FIGURE 3, the relationship between the timing generator 10 and the memory 60 is shown in greater detail. When the input signal $t_x$, which for example can be $t_1$, is applied to NOR gate 61, the clock pulses $f_c$ are removed from the slave counter 62. As a result, the output slave waveform is delayed relative to the master waveform by a time duration equal to $t_x$. The only additional necessary structure for the memory element 60 is that the slave counter 62 must be provided with a reset connection. When a reset signal and a pulse from master counter 12 coincide, the counter 62 is reset. It will be noted that with a simple NOR gate 63 which receives the output waveforms of both master counter 12 and slave counter 62, a pulse-width output signal is generated in a "non-destructive" read-out operation. To provide polarity information, NOR gate 61 can be replaced by a gate which selectively advances or retards the count to slave counter 62 under control of the polarity signals in the arithmetic unit 20, with zero represented by a 50% duty cycle. Alternatively, a simple bit storage element can be employed to store the polarity information.

Computer integrators for accumulating the results of a series of arithmetic operations are readily provided by memory elements 60 having counters of extra capacity. A convenient arrangement is to cascade a second counter in series with counter 62 to produce a large capacity.

Figure 4:
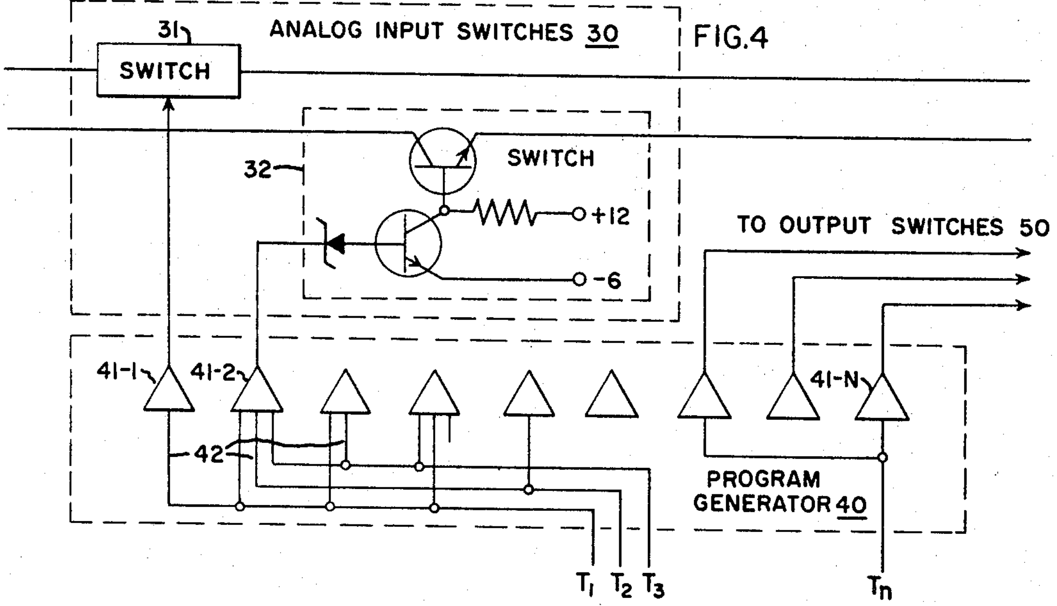
FIGURE 4 is a diagram illustrating portions of the program generator and analog switch networks in the FIGURE 1 computer.

In FIGURE 4, the simplicity of the program generator 40 is shown. A set of NOR gates 51–1, 41–2 . . . 41–N is provided so that each switch 31–1, 32–1, etc., of the analog input switch set 30 has a controlling ON-OFF element. This set of NOR gates 41–1, 42–2 . . . 41–N includes gates controlling the switches 51, 52, etc., of the analog output switch set 50 in the same manner. (It will be noted that more than one switch can be controlled by the same NOR gate.) The set of NOR gates 41–1, 41–2, . . ., 41–N provide a program because they are selectively connected by connectors 42 to the appropriate step period signals $T_1, T_2, T_3 \ldots, T_n$ of the timing generator 10 so that the proper switching is performed during each step period. Considered from another point of view, complex computation can be produced by the selection of a proper switching sequence, if an appropriate arithmetic unit is provided. It is therefore valid to consider connectors 42 to be a matrix and the set of NOR gates to be a set of buffers. It can be seen that the program generator 40 can also take many forms for implementing interchangeable programs from punch cards to memory planes. The analog input switch set 30 and analog output switch set 50 are merely sets of parallel conventional SPST switches having ON-OFF switch characteristics consistent with the accuracy of the information signals and the arithmetic unit 20.

Figure 5:
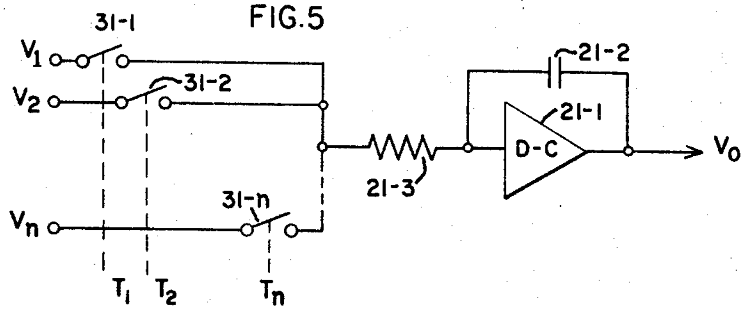
FIGURES 5–9 are diagrams illustrating various components or operations of the FIGURE 1 computer.

FIGURE 5 illustrates the way the computer performs serial addition. The set of switches 31–1, 31–2, . . . **31–*n* is arranged to connect a set of analog input D-C voltages representing a set of input variables to the arithmetic unit 20. In successive operation periods, $T_1$, $T_2$, . . . $T_n$, these voltages are connected to the integrator 21 of FIGURE 2. The summing resistor 21–3 provides a common scaling factor to produce current proportional to the input variable which is integrated. Integrator 21 stores the signals through the periods until read-out. Because the time periods for $T_n$ are equal, the final resulting voltage across capacitor 21–2 is proportional to the sum of the variables. It should be noted that the input signals can be A-C signals, if they are properly synchronized to provide an appropriate half-cycle waveform in phase with the T step periods. Parallel addition can be performed in the conventional mode with inverter 25, but this produces only a D-C voltage output which can not be stored directly in memory 60. Sequential addition can also utilize memory 60**. Although this increases the addition time, it makes possible the use of more than one integrator and hence increases the number of available input terminals.

Figure 6:
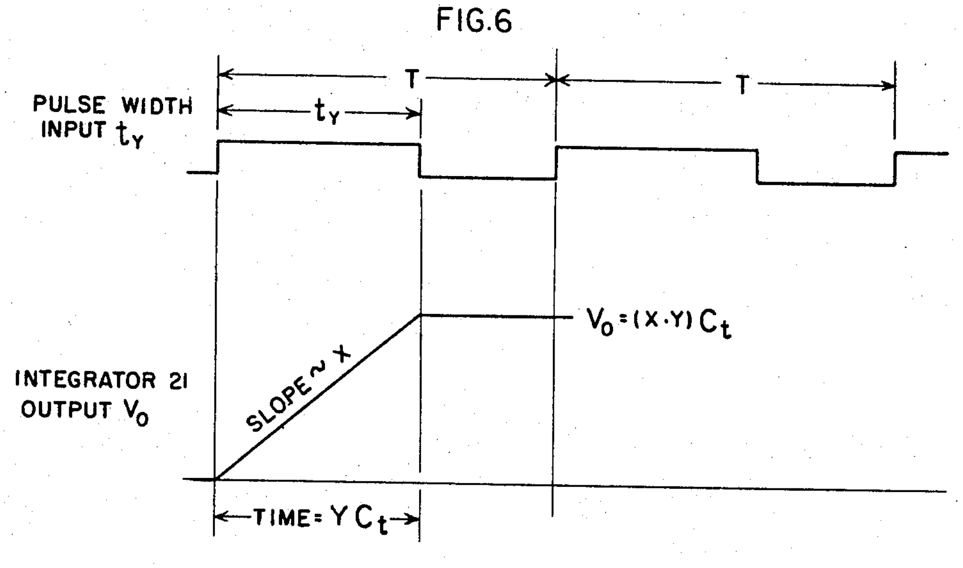

FIGURE 6 illustrates multiplication operation with an integrator and comparator in arithmetic unit 20. An output voltage $V_0$ across integrator 21 at the end of $t_y$ is proportional to the product XY, when $V_x$ a voltage proportional to one input variable is constant during $t_y$, a time period proportional to a second variable, since $$V_0=\frac{1}{RC}\int_0^{t_y} V_x dt=kV_x t_y$$

One input variable must be a D-C voltage, the other a pulse-width signal. If both variables are initially D-C voltages, one must be converted into pulse-width form; if both are pulse-width signals, one must be converted into a D-C voltage. The variable pulse-width signals operate the analog input switch among the switches 30 which connects the variable voltage to an integrator. Both signals may be bipolar.

Figure 7:
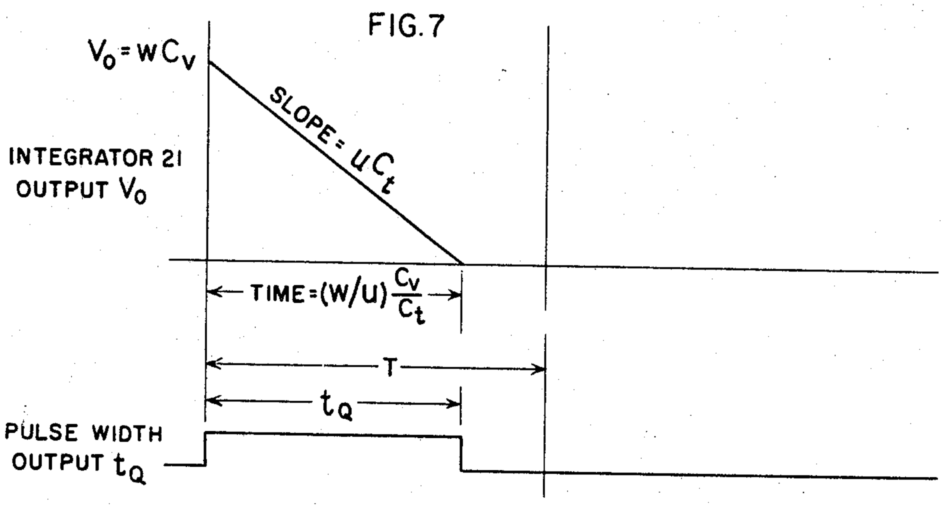

FIGURE 7 illustrates division, where voltage $V_u$ represents the divisor and $V_w$ represents the dividend, which must be set into the integrator 21 before the division operation starts. The integrator 21 output voltage decreases with a constant slope as:

$$V_0(t)=V_w-\frac{1}{RC}\int_0^{t_Q}V_u dt=V_w-KV_u t_Q$$

when $V_0(t)$ is zero, $$t_Q=V_w/kV_v$$

$V_u$ is connected to integrator 21 by an analog switch which is controlled by a pulse-width signal $t_Q$ that is generated by comparator 22 starting at the beginning of a step period and ending when the integrator output voltage reaches zero. $V_w$ can be either a positive or negative potential. $V_u$ must have the opposite polarity of $V_w$.

Figure 8:
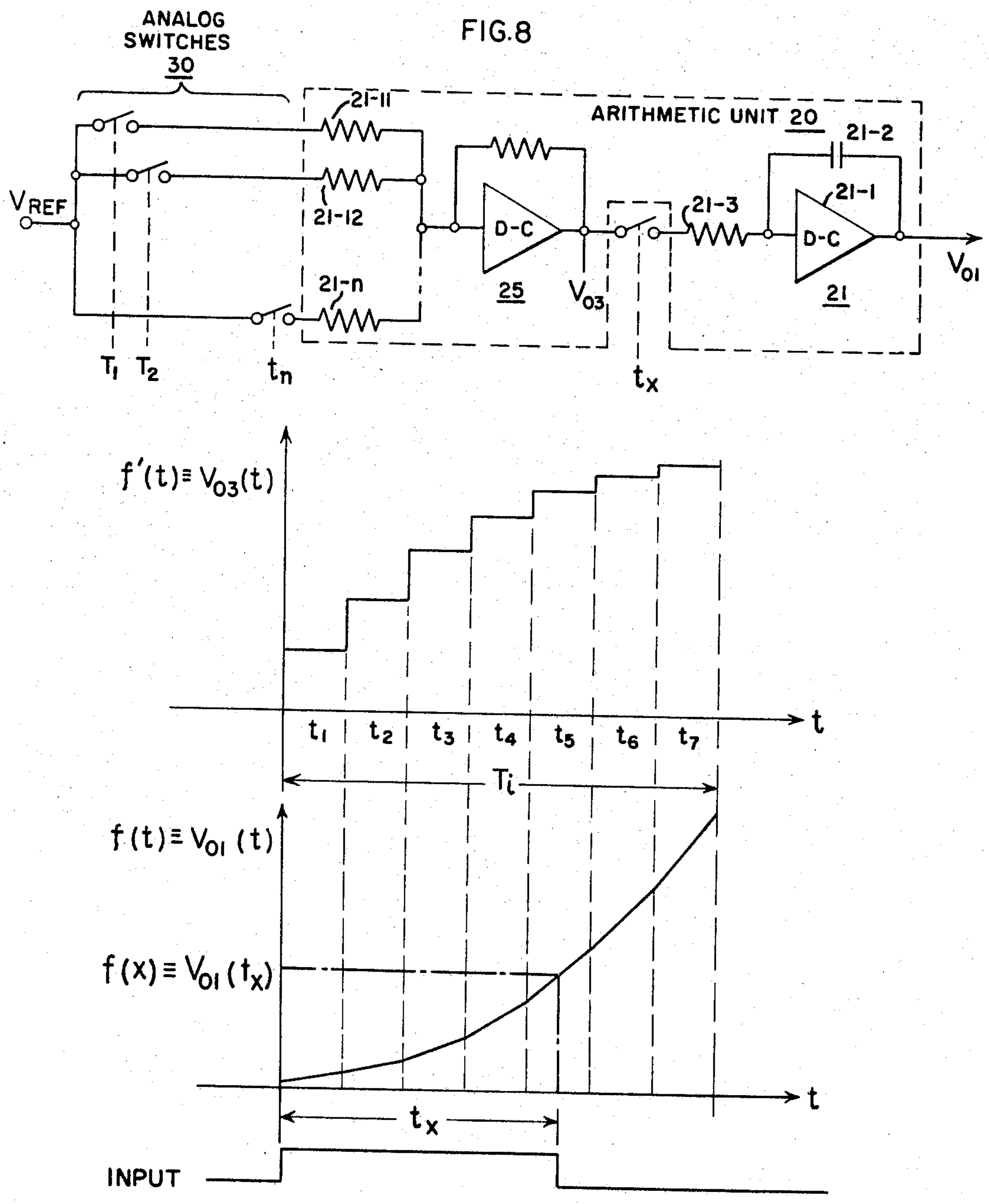

FIGURE 8 illustrates how arbitrary functions are generated where required. A staircase waveform approximating $f'(x)$, the derivative of the desired function, is generated by connecting the reference voltage $V_{REF}$ sequentially to the set of scaled resistor 21–11, etc., at the input of inverter 25. The number of segments $n$ required depends upon the accuracy desired and how fast $f'(x)$ changes. The length of segment $t_i=T_i/n$ is a binary fraction of $T_i$, for ease of generating timing intervals. Segment timing intervals $t_i$ are generated like the step periods $T_i$ with ring counters and gates. The staircase waveform is integrated to produce the linear segment curve $f(t)$. The time of integration is determined by pulse-width signal $t_x$. At the end of $t_x$, the integrator 21 output voltage is:

$$V_0=\frac{1}{RC}\int_0^{t_x}f'(t)dt=\frac{1}{RC}[f(t_x)-f(0)]$$

One set of precision resistors and one inverter are needed for each function to be generated. The accuracy of the function generator depends on the number of segments used, the function to be generated, and the precision of components. Generation of inverse functions can be accomplished by setting integrator 21 to $V_x$ and then integrating voltage function $g'(t)$ until $V_{01}$ is zero. The time required to reduce $V_{01}$ from $V_x$ to zero is the desired inverse function, since $$V_x=\int_0^{t_x}g'(t)dt=V_x-g(t_x)+g(0)$$

or if $g(0)=0$ $$t_x=g^{-1}(V_x)$$

Figure 9A:
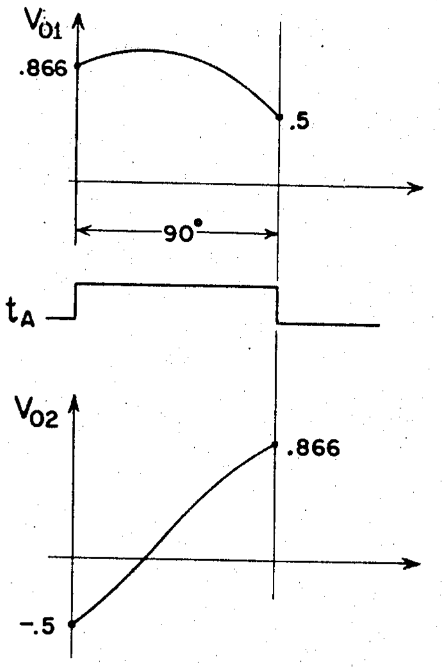
Figure 9B:
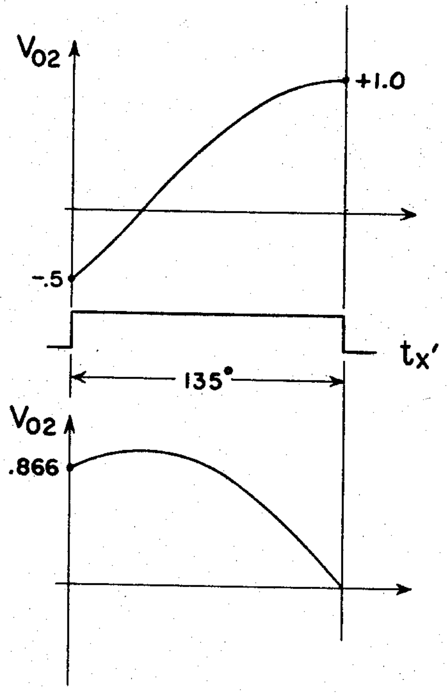

Vector rotation operations are illustrated in FIGURE 9. Two integrators and an inverter are connected into a loop as a harmonic oscillator to solve the differential equations $\ddot{X}=-kX$. Outputs of integrators 21 and 23, $V_{01}(t)$ and $V_{02}(t)$, are both solutions to such differential equations and represent components of an imaginary vector $\overline{R}$, as described in the "Electronic Analog Resolver" application cited above.

Imaginary vector $\overline{R}$ "rotates" with a constant velocity, when the harmonic oscillator loop is closed, and the integrator outputs change in sinusoidal fashion. The time during which the loop is closed is directly proportional to the angle through which R is rotated since $A=k\omega t$.

Coordinate rotation is performed by rotation of $\overline{R}$ from its initial components $V_x$, $V_y$ for a time $t_A$, which is proportional to the desired angle of rotation. The integrator voltages at the end of $t_A$ represent the desired outputs, since $$V_{01}(t_A)=V_x\cos t_A+V_y\sin t_A$$

$$V_{02}(t_A)=V_y\cos t_A-V_x\sin t_A$$

Coordinate transformation can be performed by rotating $\overline{R}$ from its initial components $V_x$, $V_y$, until $V_{02}(t)$ becomes zero. The time required for $V_{02}(t)$ to decrease from $V_y$ to zero is:

$$t_A'=\arctan(V_y/V_x)$$

Value of $V_{02}$ at time $t=t_A'$ is:

$$V_{02}(t_A')=V_x^2+V_y^2)^{1/2}$$

The initial components $V_x$, $V_y$, are SET into the integrators prior to rotation or transformation operations.

Modification of basic rotation and transformation equations permits generation of sine, cosine, arcsine, arccosine, and other trigonometric functions. Similarly, solutions to differential equations $\dot{X}=+kX$ and $\dot{X}=-kX$ can be exploited to generate exponential, logarithmic and hyperbolic equations.

An example of a computer problem well suited to the invention is conversion from earth coordinates to vehicle coordinates, as frequently used in navigation, ground control of missiles, fire control, etc. where the relations can be defined by the matrix equation:

$$\begin{bmatrix}D_x\\D_y\\D_z\end{bmatrix}=\begin{bmatrix}1&0&0\\0&\cos\phi&\sin\phi\\0&-\sin\phi&\cos\phi\end{bmatrix}\begin{bmatrix}\cos\theta&0&-\sin\theta\\0&1&0\\\sin\theta&0&\cos\theta\end{bmatrix}\begin{bmatrix}\cos A&\sin A&0\\-\sin A&\cos A&0\\0&0&1\end{bmatrix}\begin{bmatrix}D_N\\D_E\\D_D\end{bmatrix}$$

where $D_x$, $D_y$, $D_z$ are vehicle coordinates, $D_N$, $D_E$, $D_D$, earth coordinates and A, $\theta$, $\phi$ are the azimuth, pitch, and roll angles, respectively.

Figure 10:
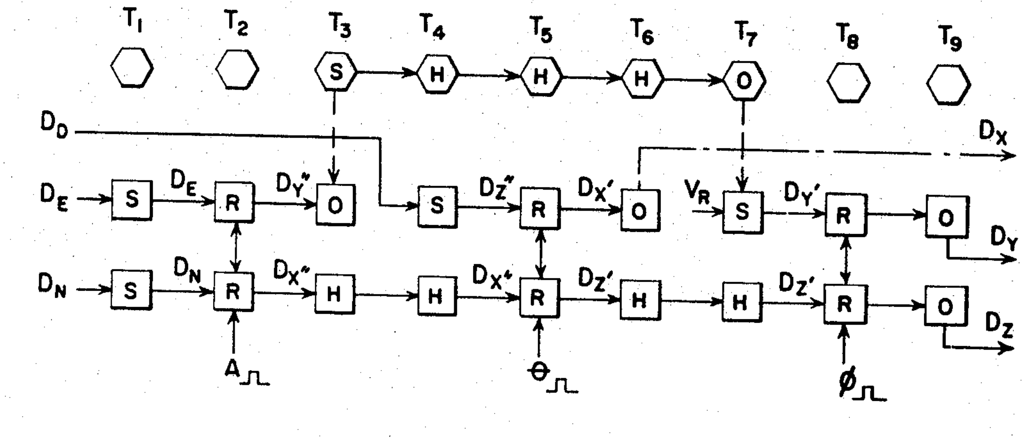
FIGURE 10 is a sequence diagram illustrating coordinate conversion.

Programming is best illustrated with flow diagram such as FIGURE 10 in which each column of squares represents one operation interval. Inputs to and outputs from a computing element and its function are explicitly indicated: S=SET initial condition, O=READ OUT, R=ROTATION, T=TRANSFORMATION, H=HOLD. Resolver operation is depicted by interconnecting two squares.

Coordinate conversion problems can be solved with the invention in various ways, depending on the speed required and the form of input/output signals. With the simplest FIGURE 2 arithmetic unit 20 (2 integrators, 2 comparators, 1 inverter), with $D_N$, $D_E$, $D_D$ as A-C or D-C voltages, and with angles in pulse-width form, problems can be solved in nine step periods. With the same inputs and an arithmetic unit having three integrator-comparator combinations, computing time is reduced to five step periods and the need for memory elements is eliminated.

$$D_x=(D_N\cos A+D_E\sin A)\cos\theta-D_D\sin\theta$$
$$=D_x''\cos\theta \qquad -D_z''\sin\theta$$
$$D_y=(D_E\cos A-D_N\sin A)\cos\phi+[(D_N\cos A+D_E\sin A)\sin\theta+D_D\cos\theta]\sin\phi$$
$$=D_y'\cos\phi \qquad +D_x'\sin\phi$$
$$D_z=(D_N\sin A-D_E\cos A)\sin\phi+[(D_N\cos A+D\sin A)\sin\theta+D_D\cos\theta]\cos\phi$$
$$=-D_y\sin\phi \qquad +D_z'\cos\phi$$

FIGURES 11A–D illustrate another application of the invention. In this case, a pair of fire control equations are solved:

$$\lambda_{v_{i+1}}=\lambda_{v_i}+\left(.8\omega_v+\omega_u\lambda_{w_i}-\frac{.8}{T}\lambda_{v_i}\right)\Delta T$$

$$\lambda_{w_{i+1}}=\lambda_{w_i}+\left(.8\omega_w+\omega_u\lambda_{v_i}-\frac{.8}{T}\lambda_{w_i}\right)\Delta T$$

Figure 11C:
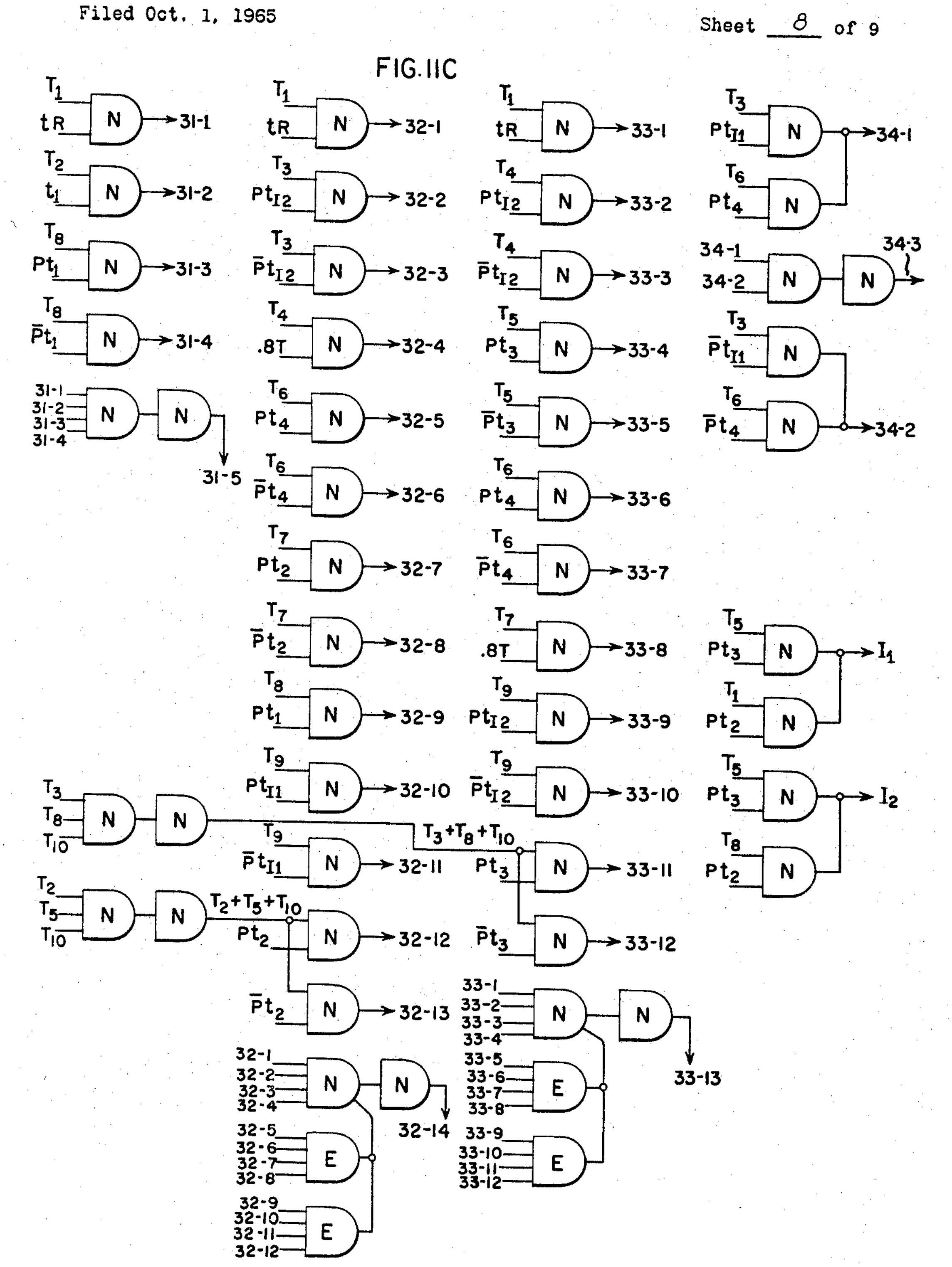
Figure 11D:
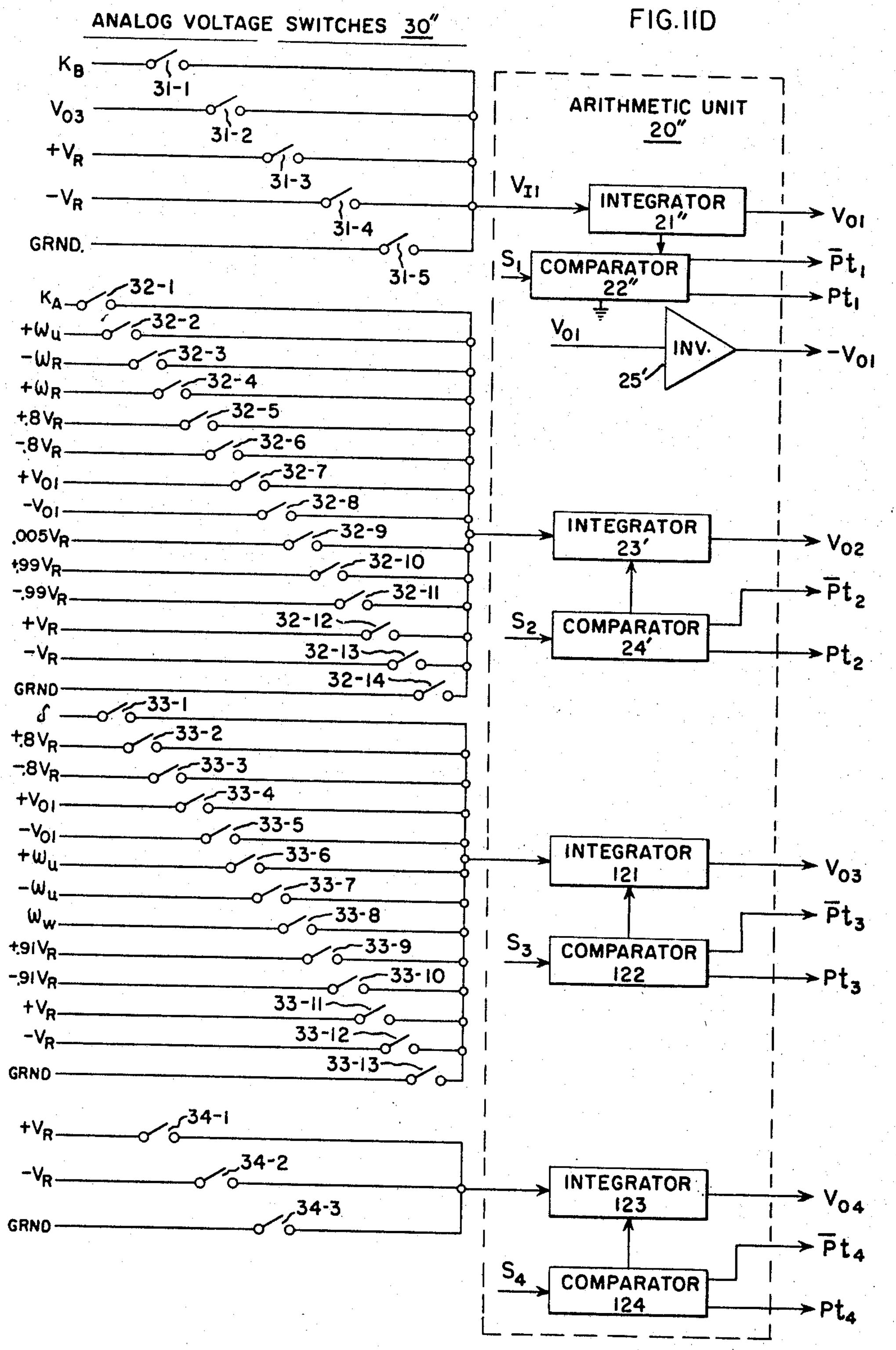

FIGURE 11A is a flow diagram for the solution of equations in the same form as FIGURE 10 and utilizing the same symbols for the arithmetic operations involved. FIGURE 11B is a table showing the switching signals required from the program generator 40'' for the sets of input analog voltage switches 30''. The program generator 40'', in the form of a set of NOR gates, is shown in FIGURE 11C and the sets of analog voltage switches 30'' are shown in FIGURE 11D together with the arithmetic unit 20''. The latter is essentially two of the basic arithmetic units 20 shown in FIGURE 2, augmented by two further integrator elements.

The computer outputs from arithmetic unit 20 are made available through the set of analog output switches 50 intermittently and as pulse-width signals. This arrangement can be modified in numerous ways, depending on the application. In view of the existing apparatus, the preferred mode for producing continuous analog signals is to use a channel of memory 60 to store the desired continuous output signals, updated with any new computed values, and to provide an output rectangular waveform which is filtered to produce a D-C voltage proportional to the waveform duty cycle and therefore proportional to the intermittent pulse-width output signal.

While particular embodiments of the invention have been shown and described herein, it is not intended that the invention be limited to such disclosure, but that changes and modifications can be made and incorporated within the scope of the claims.

What is claimed is:

1. A sequential computer comprising:
(a) an arithmetic unit responsive to analog and pulse-width signals producing pulse-width and analog output signals for performing a plurality of arithmetic operations;
(b) memory elements responsive to and producing pulse-width signals representing the result of an arithmetic operation so that the signal can be available in the next step of the sequence;
(c) a timing signal generator responsive to clock signals and producing sequential timing pulses;
(d) switch means selectively coupling input signals to said airthmetic unit and coupling said output signals produced by said arithmetic unit to other components of said computer;
(e) a programmer operating said switch means responsive to said sequential timing pulses control the functions and the arithmetical operations performed.

2. A sequential computer comprising:
(a) an arithmetic unit having
 (1) at least one pair of analog integrators capable of storing signals,
 (2) an analog inverter,
 (3) analog comparators for said integrators,
 (4) connecting means permitting selective connection of said integrators and inverter in a closed loop or for parallel arithmetic operations and adapted to produce pulse-width output signals;
(b) a set of analog switches having
 (1) a portion of the switches arranged to control the arithmetic operation performed by the arithmetic unit by selecting signal paths from selected input terminals through a series of selected arithmetic unit components,
 (2) a portion of the switches arranged to selectively switch the output of a plurality of arithmetic unit components to the output of the arithmetic unit;
(c) a sequence programmer having
 (1) switching signal means responsive to step signals to operate selectively and sequentially said set of analog switches in accordance with a desired computer program,
 (2) matrix means for varying the connections of said step signals to said switching signal means in accordance with a desired computer program;
(d) a timing generator having
 (1) a master counter, responsive to clock pulses, for generating step timing signals for said programmer and memory means providing a time reference for the computer,
 (2) function selection circuit, responsive to said master counter, for stepping said programmer so that the set of desired arithmetic operations and parallel operations is energized.

3. The computer of claim 2 further comprising:
(e) memory means having
 (1) a plurality of simple counters for clock pulses,
 (2) gating means for controlling the application of clock pulses to selected said counters so that the phase of each counter output waveform relative to a step timing waveform represents the stored variable in pulse-width form.

4. A sequential computer comprising:
(a) an arithmetic unit having
 (1) at least one pair of analog integrators,
 (2) an inverter,
 (3) analog comparators for respective said integrators,
 (4) connecting means permitting selective connection of said integrators and inverter in a closed loop or for parallel arithmetic operations;
(b) a set of analog switches having
 (1) a portion of the switches arranged to control the arithmetic operation performed by the arithmetic unit,
 (2) a portion of the switches arranged to selectively switch the output of the arithmetic unit;
(c) a sequence programmer having
 (1) switching signal means responsive to step signals to operate selectively and sequentially said analog switches in accordance with a desired program,
 (2) an interchangeable matrix means for varying the connections of said step signals to said switching signal means;
(d) memory means having
 (1) a plurality of simple counters for clock pulses,
 (2) gating means for controlling the application of clock pulses to selected said counters so that the phase of each counter output waveform relative to a step timing waveform represents the stored variable in pulse-width form;
(e) a timing generator having
 (1) a master counter, responsive to clock pulses, for generating step timing signals for said programmer and memory means,
 (2) an electronic function selection circuit, responsive to said master counter, for stepping said programmer.

5. A multi-purpose sequential analog-digital computer comprising:
(a) an arithmetic unit having a plurality of components;
(b) a source of analog and reference signals;
(c) control circuitry interconnecting said unit and said source for selectively applying said signals to said arithmetic unit and for selectively activating said components including:
 (1) switches;
 (2) a timing signal generator;
 (3) a digital sequence programmer operating said switches responsive to said generator;

(d) said arithmetic unit components including pairs of an analog integrator and a comparator, said comparator responsive to signals from said integrator and said generator creates pulse-width signals having a pulse duration proportional to said signals from said integrator.

6. The computer of claim 5 further comprising:

(e) a memory unit responsive to signals produced by said timing signal generator and to said pulse-width signals for storing information in pulse-width form.

References Cited

UNITED STATES PATENTS

| | | | |
|---|---|---|---|
| 3,143,643 | 8/1964 | Fluegel et al. | 235—150.4 |
| 3,185,821 | 5/1965 | Lee et al. | 235—150.4 |
| 3,231,723 | 1/1966 | Gilliland et al. | 235—150.4 |
| 3,243,582 | 3/1966 | Holst | 235—150.4 |
| 3,284,616 | 11/1966 | Ernuei et al. | 235—150.51 X |

OTHER REFERENCES

IRE Transactionson Electronic Computers, A Pulse Position Modulation Analog Computer, E.V. Bohn, June 1960, pp. 256–261.

MALCOLM A. MORRISON, *Primary Examiner.*

JOSEPH F. RUGGIERO, *Assistant Examiner.*

U.S. Cl. X.R.

235—150.5